United States Patent Office 2,809,155
Patented Oct. 8, 1957

2,809,155

HYDROCARBON DISTILLATION PROCESS

Oscar R. Buehler, Orange, Tex., assignor to E. I. du Pont de Nemours and Company, Wilmington, Del., a corporation of Delaware No Drawing. Application March 17, 1954,
Serial No. 416,945

2 Claims. (Cl. 202—57)

This invention relates to a process for inhibiting polymerization during the distillation of compositions containing unsaturated hydrocarbons.

In the distillation of compositions containing unsaturated hydrocarbons, it is known that polymerization of these compounds is likely to occur. When the hydrocarbon compositions subjected to distillation contain even small amounts of diolefin, such as butadiene, isoprene, cyclopentadiene, or the like, there is frequently formed a particularly obnoxious kind of polymer which has been designated in the industry as "popcorn" polymer. This "popcorn" polymer is obnoxious because it is essentially non-fusible and insoluble in ordinary solvents. Hence, once the "popcorn" polymer has formed, it can be removed from the distillation equipment only with the greatest difficulty. This removal, in practice, ordinarily involves a complete shutdown of the equipment so that the polymer can be removed manually. Furthermore, once a seed of this polymer has been formed, it propagates rapidly, despite the presence of ordinary polymerization inhibitor. Apparently, the initial formation of the "popcorn" polymer is dependent upon the presence of diolefin.

This "popcorn" polymer can interfere very seriously with commercial distillation operations. It adheres tenaciously to heat transfer surfaces, with the result that the rate of heat transfer through the equipment drops off very rapidly. It also forms on the trays or packing in the columns and prevents the normal flow of the liquids and gases therein. If allowed to propagate for a long enough period of time, the "popcorn" polymer can actually result in distortion of rupture of the equipment.

In copending United States patent application of O. R. Buehler, S. N. 321,711, filed November 20, 1952, now abandoned, it was disclosed that inhibitors of a rather wide variety are effective in delaying, although not preventing, "popcorn" polymer formation. Synergistic effects, produced by particular pairs of inhibitors, were noted (cf. also U. S. Patents 2,361,538, and 2,557,684). The best pairs of inhibitors reported by Buehler were of the following types (1) a hydrazino compound and an organic acid (2) a catechol and an ammonia-type compound. These combinations were shown to be capable of postponing shut down in the deethanizer and depropanizer operations (described hereafter) in the purification and distillation of ethylene, for a period of six months. Also mentioned in the said patent application S. N. 321,711 was the use of one or more alkyl nitrites in conjunction with a hydrazine-acid mixture or a catechol-ammonia mixture. Also, the United States patent to E. E. Lewis, 2,730,489, discloses the use of alkyl nitrites to prevent "popcorn" polymer formation and states that a synergistic result is obtained when the alkyl nitrite inhibitor is used with the catechol type inhibitors. The Lewis application also mentions the use of phenyl hydrazine as an inhibitor component.

In general, the purification processes to which the present invention is directed and in which it is important to prevent or delay "popcorn" polymer formation are those in which a solution of crude ethylene (contaminated with butadiene) in a normally liquid hydrocarbon (e. g. xylene, or a more highly alkylated benzene) is maintained under elevated pressure (at least 200 pounds per square inch) and at temperatures which generally do not exceed 200° C. Such solutions can be subjected to conditions of temperature and pressure which release selectively an ethylene fraction relatively depleted of higher boiling contaminants, which upon fractional distillation of the ethylene fraction, yields purified ethylene. Typical mixtures which produce "popcorn" polymer are the following:

| Component | Original Solution, mol fraction | After deethanization, mol fraction | After depropanization, mol fraction |
|---|---|---|---|
| Methane | 0.0032 | | |
| Ethylene | 0.2322 | 0.0069 | |
| Ethane | 0.0703 | 0.0032 | |
| Propylene | 0.2186 | 0.3222 | 0.0105 |
| Propane | 0.1769 | 0.2740 | 0.0518 |
| Butadiene | 0.0048 | 0.0076 | 0.0175 |
| Butene-1 | 0.0167 | 0.0265 | 0.0611 |
| Butene-2 | 0.0173 | 0.0274 | 0.0633 |
| 2 Methyl butadiene | 0.0182 | 0.0288 | 0.0666 |
| Cyclopentadiene | 0.0012 | 0.0019 | 0.0044 |
| Cyclopentene | 0.0143 | 0.0227 | 0.0524 |
| Pentene-1 | 0.0200 | 0.0317 | 0.0732 |
| Pentene-2 | 0.0239 | 0.0378 | 0.0873 |
| 3 Methyl-1-pentene | 0.0033 | 0.0052 | 0.0120 |
| Hexadienes | 0.0048 | 0.0076 | 0.0175 |
| Cyclohexene | 0.0003 | 0.0005 | 0.0011 |
| Benzene | 0.0802 | 0.1270 | 0.3113 |
| Heavy Hydrocarbons, average M. W. 112 | 0.0438 | 0.0690 | 0.1700 |
| Tails temperature, ° C | 49 | 112 | 145 |

It is an object of this invention to provide further improvements in processes for distilling compositions comprising unsaturated hydrocarbons. It is another object of this invention to provide a polymerization inhibitor capable of preventing or delaying undesirable polymerizations, when carrying out the distillation of unsaturated hydrocarbons, for longer periods of time than were possible heretofore. A further object of the invention is to provide an improved process for concentrating or purifying a hydrocarbon containing no more than 4 carbon atoms from a hydrocarbon composition comprising diolefins of 3 to 6 carbon atoms, although diolefins of more than 6 carbon atoms may be present in some variations of this process. A still further object of the invention is to provide an improved process for purifying ethylene wherein a low-boiling hydrocarbon mixture containing said ethylene and also containing a small amount of butadiene is absorbed in a higher-boiling hydrocarbon mixture, and thereafter subjected to distillation in the presence of an effective polymerization inhibitor. Other objects of the invention will appear hereinafter.

In accordance with this invention there is provided a process for minimizing polymer formation when distilling a composition comprising a major portion of hydrocarbons containing no more than six carbon atoms, said composition containing at least 0.01 per cent by weight of a diolefin having from 3 to 6 carbon atoms, which process comprises carrying out the distillation of said composition in the presence of a specific combination of polymerization inhibitors, each constituting from 10 to 1000 parts by weight per million parts of the said composition. The polymerization inhibitors of the present invention are fully described hereinafter.

The process of the present invention is useful in connection with the distillation, redistillation, concentration and/or purification of hydrocarbon-containing compositions in which at least a portion of the hydrocarbons comprises a relatively low-molecular weight unsaturated hydrocarbon. The hydrocarbon mixtures suitable for use in this process are those in which a major portion of the composition, i. e., at least 50% by weight, is made up of hydrocarbons containing no more than 6 carbon atoms. These relatively low-molecular weight hydrocarbons may be paraffins, isoparaffins, olefins, diolefins, alicyclic compounds, or aromatic compounds. In the distillation of compositions of this nature, the major difficulty apparently stems from the presence of one or more diolefins. Hence, the polymerization inhibitors of the present invention find the greatest utility in connection with the distillation of compositions containing at least a small amount of a diolefin. If desired, the compositions which are subjected to distillation may consist almost entirely of diolefins, although the preferred process involves the distillation of compositions containing relatively large amounts of low-molecular weight paraffins and monoolefins together with only relatively small amounts of diolefins. The mixture which is subjected to distillation may also comprise non-hydrocarbon portions such as hydrogen, oxygenated compounds having boiling points close to the hydrocarbons, polymerization inhibitors other than the preferred ones of this invention, etc. Preferably, however, the compositions which are subjected to distillation in accordance with the process of the present invention consist almost exclusively of hydrocarbons.

According to one feature of the invention, a mixture consisting primarily of $C_2$ and $C_3$ saturated and unsaturated hydrocarbons, together with relatively small amounts of $C_4$ and $C_5$ diolefins, is subjected to a distillation operation for the concentration or purification of one or more of its constituents, notably ethylene. Such a mixture may be derived for instance from the catalytic or non-catalytic cracking of ethane, propane, propylene, butane, or the like. The treatment of such a mixture may involve absorbing it in a relatively higher-boiling hydrocarbon absorption medium. The enriched absorption medium may then be treated for the stepwise removal of the various hydrocarbons. For example, it may be treated initially in a deethanizer, from which ethylene and ethane are removed overhead. The partially stripped absorption medium may then be passed from the deethanizer to a depropanizer from which propane and propylene are removed overhead. At least a portion of the stripped absorption medium that is removed from the deethanizer may then be recycled to the absorber. A process of this general nature is particularly useful for the manufacture of highly purified ethylene, the ethylene being recovered by fractionation of the gases taken overhead from the deethanizer.

The present invention is based upon the discovery that a specific combination of inhibitors, namely, (1) a compound of the formula $R \cdot NO_2$ in which R is a hydrocarbon radical having from 1 to 8 carbon atoms and having an aliphatic carbon atom to which the nitrite group is attached, (2) a catechol, and (3) an aryl hydrazine, exerts an inhibiting effect on popcorn polymer formation and growth in excess of the additive effects of the individual inhibitors or any pair thereof. The discovery of this synergistic inhibition has made it possible to operate ethylene purification equipment for about one year without closing down the operation and without difficulty from popcorn polymer formation.

This synergistic combination of inhibitors can be added at any point in the distillation unit. The mixed inhibitors can be added at the top of the column, at any intermediate portion of the column, or at the bottom, in the pot or calandria. They may be added along with the feed or introduced into the reflux. They may be added to any one of several interconnected distillation columns or to several such columns. They may be added as the pure compounds, or in solution in a suitable solvent, either as a solid stream or in the form of a mist or dispersion. When the distillation is such that only the very low-boiling hydrocarbons such as ethane, ethylene, propane or propylene, are being taken overhead, and the diolefins remain in the liquid phase, satisfactory results may be obtained by merely introducing the inhibitors near the bottom of the column or into the pot or calandria. On the other hand, if one or more of the diolefins, such as butadiene, isoprene, cyclopentadiene, the piperylenes, or the hexadienes are to be taken overhead in any appreciable amount, it is highly advisable to introduce the inhibitors at the top of the column or with the reflux or at the condenser inlet. Furthermore, if any "popcorn" polymer has had an opportunity to form near the top of the column, it is advantageous to introduce the inhibitors of the top of the column.

The distillation process of the present invention can be carried out either batchwise or continuously. Either the heads or the bottoms from a given column may be passed to a subsequent distillation unit, in which case the inhibitors may be carried along and the introduction of inhibitor at one point in a system can serve to protect a whole series of columns or distillation units.

The temperatures and pressures employed are, of course, dependent upon the particular separation being effected. The synergistic inhibition mixtures of this invention may be employed satisfactorily in distillation processes operated at either atmospheric, subatmospheric, or superatmospheric pressure.

The concentrations of the inhibitors referred to herein are based upon the weight of inhibitor present at a particular moment within a given distillation unit as compared to the total weight of liquid material present in the unit at that time. In order to provide satisfactory protection, there should be present at least 0.001 percent of the mixed inhibitors. In some instances, amounts up to 5 percent may be employed or may be required. Usually, however, very small amounts of inhibitors will provide satisfactory protection and it therefore is generally not necessary to employ a concentration greater than about 0.10 percent. In processes which are operated continuously, or where the inhibitor is added with the feed or the reflux, or where the effluent from one colum is passed along to one or more subsequent columns, it will be necessary to calculate the holdup of a particular distillation unit and the rate of introduction and removal of the inhibitor in order to provide the desired concentration.

Prior to starting up a given distillation unit, it is sometimes helpful to circulate through the unit a solution containing a relatively large concentration of the inhibitors in a solvent devoid of polymerizable constituents. In this way, the formation or propagation of "popcorn" polymer which might otherwise occur during the initial phase of the distillation, or before the inhibitor reaches a given point, is effectively prevented.

The superior results obtained when using the polymerization inhibitors of the present invention are very striking, as shown by the following examples.

*Example.*—In an installation involving the absorption of a cracked hydrocarbon mixture in a higher-boiling hydrocarbon absorption medium (a benzene "sponge oil") (475 p. s. i., temperature of overhead stream, −18° C.) followed by treatment of the enriched absorption medium (49° C.) in a deethanizer (pressure 500 p. s. i., temperature of overhead stream, 2° C., temperature of liquid draw-off from base, 112° C.), and then a depropanizer (pressure 260 p. s. i., temperature of overhead stream 49° C.), an inhibitor composition consisting of 260 p. p. m. phenyl hydrazine, 350 p. p. m. isoamyl nitrite, and 600 p. p. m. p-tertiary butyl catechol is introduced into the deethanizer feed. The tails from the deethanizer are passed to the middle of the depropanizer. A portion of the tails from the depropanizer, still containing the inhibitors is passed back to the top of the absorber where it becomes enriched in the relatively lower boiling hydrocarbons. The effluent from the bottom of the absorber is then passed as feed to the middle of the deethanizer, where more of the same inhibitor mixture is added continuously, to make up for losses in the system and for the portion which leaves the system at the bottom of the depropanizer. Hence, by introducing the mixture of inhibitors into the deethanizer, the inhibitors are carried over into the depropanizer and thence into the absorber, thus providing highly effective protection for all three of these distillation units. This operation was continued for about one year without accumulation of popcorn polymer in the system. The individual inhibitors, when used in place of the mixed inhibitors in the same total concentration failed to prevent popcorn polymer formation over a period of six months.

It is noteworthy that not only was the need for frequently replacing or cleaning equipment lessened by the use of the effective synergistic inhibitors of this invention, but also the rate of production of purified ethylene was greatly improved during the time when the equipment was in operation. The specific combination of inhibitors was superior to the individual inhibitors, and pairs thereof, but it was also superior to combinations of t-butyl catechol and isoamyl nitrite with other effective inhibitors, such as n-butyl p-amino phenol and N,N'-disalicylidene 1,2-diaminopropane. Over a 9.5 month period the production rate was about 40% higher due to the use of the specific combination of inhibitors herein set forth, than with multi-component inhibitors containing only two (i. e. not all three) of the three inhibitors used in the practice of this invention.

There is a critical range of temperature, above which polymerization of diolefin monomer proceeds very rapidly with the preferred concentration of inhibitors herein disclosed. This critical temperature is generally within the range of 100°–200° C. It has been established that, in the process illustrated in the above-described example, the deethanizer boil-up temperature, which is substantially the same as the temperature of the liquid drawn off from the base of the deethanizer (usually held at 110°–120°), must not exceed 130°–135° C., if "popcorn" polymerization is to be suppressed completely.

No satisfactory theory has been advanced to explain the nature and characteristics of the "popcorn" polymer or the differences between various combinations of inhibitors in preventing growth of "popcorn" polymer. The polymer is a non-fusible, non-soluble material which appears to be extensively cross-linked. It is not known whether the presence of air, peroxides, or free radicals has anything to do with the formation or propagation of this polymer. Ordinary free radical inhibitors of the type which remove peroxides, however, are ineffective on preventing its propagation. The inhibitors of the present invention are most effective when employed before any "popcorn" polymer has had a chance to form, but even if some of the polymer has formed, these inhibitors are also highly effective in inhibiting further propagation.

As will be readily apparent to those skilled in the art, various changes and modifications may be made in this process without departing from the spirit and scope of this invention.

This application is a continuation-in-part of copending application S. N. 321,711, filed November 20, 1952.

I claim:

1. The method of preventing "popcorn" polymer formation in a solution of crude ethylene in a normally liquid hydrocarbon medium, said ethylene being contaminated with butadiene as an impurity, which comprises maintaining the said solution under distillation conditions, in the presence of a mixed synergistic inhibitor consisting of phenyl hydrazine, isoamyl nitrite, and p-tertiary butyl catechol, the quantities of each inhibitor being from 10 to 1000 parts per million parts by weight of said solution, under pressure of at least 260 p. s. i. at a temperature not exceeding the critical temperature above which "popcorn" polymer forms in the mixture, said critical temperature being within the range of 100° C. to 200° C.

2. The method of preventing "popcorn" polymer formation in a solution of crude ethylene in a normally liquid hydrocarbon medium, said ethylene being contaminated with butadiene as an impurity, which comprises maintaining the said solution under distillation conditions, in the presence of a mixed synergistic inhibitor comprising 260 parts of phenyl hydrazine, 350 parts of p-tertiary butyl catechol, and 600 parts of isoamyl nitrite, per million parts by weight of said solution, under pressure of at least 260 p. s. i. at a temperature not exceeding the critical temperature above which "popcorn" polymer forms in the mixture, said critical temperature being within the range of 100° C. to 200° C.

References Cited in the file of this patent

UNITED STATES PATENTS

| | | |
|---|---|---|
| 2,361,538 | Franz | Oct. 31, 1944 |
| 2,388,429 | McKinnis | Nov. 6, 1945 |
| 2,407,861 | Wolk | Sept. 17, 1946 |
| 2,557,684 | Powers | June 19, 1951 |
| 2,663,415 | Chenicek | Mar. 31, 1953 |
| 2,730,489 | Lewis et al. | Jan. 10, 1956 |